United States Patent
Persson et al.

(10) Patent No.: US 9,215,667 B2
(45) Date of Patent: Dec. 15, 2015

(54) DEVICE AND METHOD FOR TRANSMIT POWER CONTROL

(75) Inventors: Anders Persson, Kode (SE); Markus Ringstrom, Stockholm (SE); Zhuo Cheng, Solna (SE); Jing Rao, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/880,812

(22) PCT Filed: Oct. 21, 2010

(86) PCT No.: PCT/SE2010/051137
§ 371 (c)(1),
(2), (4) Date: Apr. 22, 2013

(87) PCT Pub. No.: WO2012/053951
PCT Pub. Date: Apr. 26, 2012

(65) Prior Publication Data
US 2013/0225225 A1  Aug. 29, 2013

(51) Int. Cl.
*H04B 7/00* (2006.01)
*H04W 52/24* (2009.01)
*H04W 52/28* (2009.01)
*H04W 52/14* (2009.01)

(52) U.S. Cl.
CPC .......... *H04W 52/241* (2013.01); *H04W 52/287* (2013.01); *H04W 52/288* (2013.01); *H04W 52/146* (2013.01)

(58) Field of Classification Search
USPC .............. 455/522, 68–70, 115.3, 126, 127.1, 455/127.2, 135, 226.3, 277.2, 296; 370/318
See application file for complete search history.

(56) References Cited

U.S. PATENT DOCUMENTS

| | | | |
|---|---|---|---|
| 7,742,781 B2 * | 6/2010 | Chen et al. ..................... 455/522 |
| 2003/0130002 A1 | 7/2003 | Chen et al. |
| 2004/0047328 A1 * | 3/2004 | Proctor et al. ................ 370/342 |
| 2005/0043047 A1 * | 2/2005 | Vigier et al. .................. 455/509 |
| 2008/0161033 A1 * | 7/2008 | Borran et al. ................. 455/522 |
| 2009/0147803 A1 * | 6/2009 | Takayama ..................... 370/475 |
| 2009/0239590 A1 * | 9/2009 | Parkvall ........................ 455/572 |
| 2010/0103901 A1 * | 4/2010 | Miki et al. ..................... 370/330 |
| 2010/0194559 A1 * | 8/2010 | Huang ..................... 340/539.26 |
| 2010/0240314 A1 * | 9/2010 | Chang et al. ............... 455/67.11 |
| 2011/0319120 A1 * | 12/2011 | Chen et al. ..................... 455/522 |

FOREIGN PATENT DOCUMENTS

EP  1 811 684 A2  7/2007
WO  WO 2004/013981 A2  2/2004

* cited by examiner

Primary Examiner — Dominic E Rego

(57) ABSTRACT

A controlling node for a cellular communications system, arranged to determine and transmit commands for Transmit Power Control, TPC, to one or more Mobile Terminals, MTs, in at least one cell in the system. The controlling node is arranged to classify an MT as being in one of a number of states, and to use differing methods for determining an MT's TPC command depending on which state the MT is in, so that one method is used for determining TPC commands to an MT in the active state and another method is used for determining TPC commands to an MT in the passive state.

12 Claims, 6 Drawing Sheets

DEVICE AND METHOD FOR TRANSMIT POWER CONTROL

TECHNICAL FIELD

The present invention discloses a controlling node with improved transmit power control and a corresponding method.

BACKGROUND

Scheduling by means of Time Division, TD, is an important parameter for achieving high spectral efficiency in the uplink in WCDMA systems. In TD scheduling of the so called Enhanced Uplink, EUL, only a certain amount of users at a time in a cell are allowed to transmit payload data on the E-DCH Dedicated Physical Data Channel, abbreviated as E-DPDCH, in a Transmission Time Interval, a TTI, while the other users in the cell are only allowed to transmit control data in the uplink in that particular TTI.

A user, also referred to as a Mobile Terminal, an MT, thus transmits payload data in certain TTIs and control data in other TTIs. An MT which transmits data on the E-DPDCH in a particular TTI will in this text be referred to as an active MT, and a MT which doesn't transmit data on the E-DPDCH in a TTI but only transmits control data on control channels, or which makes no transmissions at all in a TTI, will here be referred to as a passive MT. Naturally, an active MT is also arranged to transmit control data on control channels in its active state, so that an MT may transmit both payload data and control data in its active state.

Which state an MT is in is decided by the controlling node, the NodeB, of the cell that the MT is in. In addition, the output power used by an MT in its uplink transmissions is also decided by the NodeB by means of transmitting so called Transmit Power Control Commands, TPC commands, to the MTs in the cell.

Due to non-orthogonality of UL channels among different MTs, an active MT suffers less interference from transmissions from passive MTs than the interference suffered by passive MTs from the active MT. As a consequence, the interference which an MT perceives changes abruptly at transitions between the active and the passive state, with the interference typically being higher in the passive state.

Thus, as explained, a passive MT suffers more interference than an active MT, so an MT has to be controlled by the NodeB to raise its transmission power substantially when going from the active to the passive state in order to maintain a SIR close to the SIR target. When a passive MT turns to active, the SIR is well above SIR target, and the transmission power of the MT is reduced by the NodeB, since there is less interference. In this manner, the transmission power control of the MTs as controlled by the NodeB may lead to power peaks in TD scheduling scenarios. The behavior of increasing and decreasing the transmit power as controlled by the NodeB is repeated as the state of the MT changes from active to passive throughout the session.

High transmission power of passive MTs will increase the Rise over Thermal, RoT, in the cell, which becomes a drawback from a network performance perspective. Moreover, an MT is likely to transmit with too high power (exceeding SIR target) when entering an active TTI.

SUMMARY

It is a purpose of the present invention to obviate at least some of the disadvantages mentioned above concerning transmit power control by a NodeB of MTs in the active and the passive state, as well as reducing some of the interference problems mentioned above.

This purpose is addressed by the present invention in that it discloses a controlling node for a cellular communications system which is arranged to determine and transmit commands for Transmit Power Control, TPC, to one or more Mobile Terminals, MTs, in at least one cell in the system.

The controlling node is arranged to classify an MT as being in one of a number of states, and to use differing methods for determining an MT's TPC commands depending on which state the MT is in, so that one method is used for determining TPC commands to an MT in the active state and another method is used for determining TPC commands to an MT in the passive state.

Thus, by means of the invention, a controlling node is obtained which can adapt its Transmission Power Control method for different MTs according to the state of the MT, so that the risk of, for example, power peaks can be eliminated or at least that their occurrence can be reduced, while problems with RoT in neighbouring cells can also be reduced.

In one embodiment of the controlling node, the states which an MT can be classified as being in comprise an active state in which the MT is arranged to transmit payload data and control data, and a passive state in which the MT is arranged to transmit control data or to not make any transmissions at all.

In one embodiment, the controlling node is arranged to use one of the following as TPC method for MTs in the active state and another of the following as TPC method for MTs in the passive state:

A TPC method which is based on the received Signal to Interference Ratio of transmissions from the MT, A TPC method which is based on the Signal to Interference and Noise Ratio of transmissions from the MT which is classified as being in the active state for determining TPC commands to the MT, A TPC method which is based on the Received Signal Code Power of transmissions from the MT, A TPC method which is based on the Rise over Thermal of transmissions from the MT.

In one embodiment, the controlling node is arranged to receive payload data from MTs on a data channel.

In one embodiment, the controlling node is arranged to receive control data from MTs on a control channel.

BRIEF DESCRIPTION OF THE DRAWINGS

The invention will be described in more detail in the following, with reference to the appended drawings, in which.

DETAILED DESCRIPTION

Figure 1:
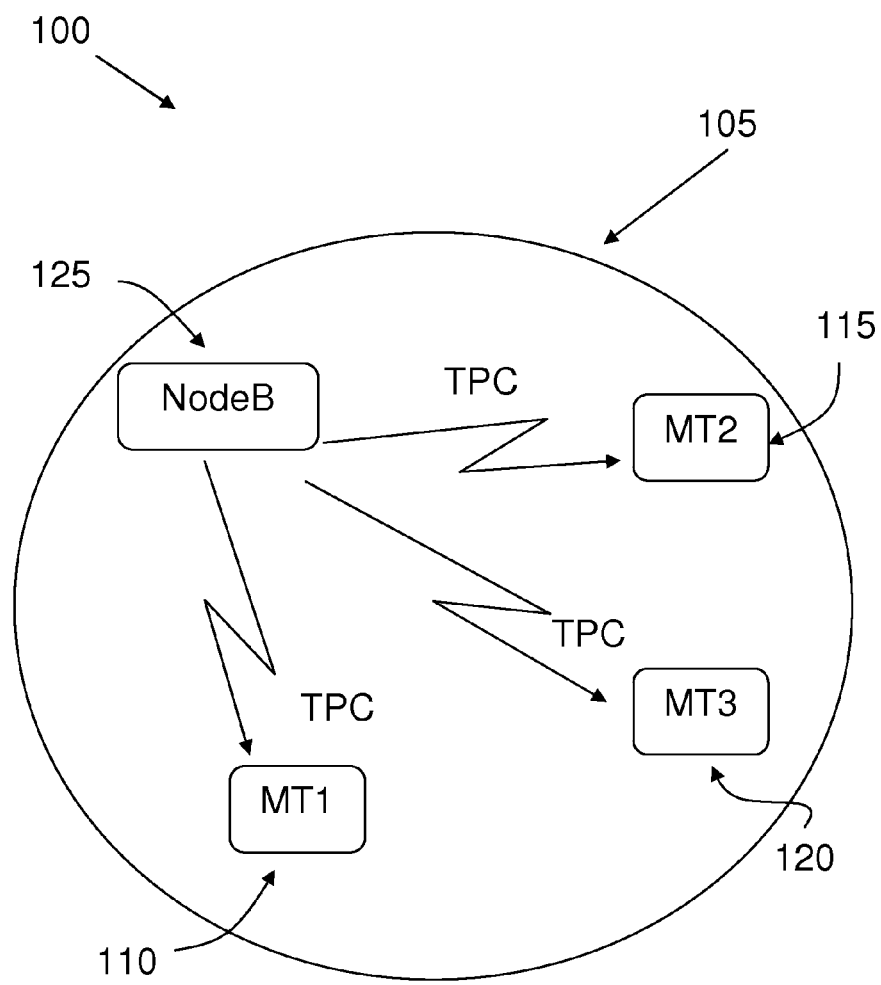
FIG. 1 shows an overview of a part of a cellular system in which the invention is applied.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an overview of a part of a cellular system 100 in which the system is applied. The system 100 is a cellular system of the WCDMA or CDMA type, and comprises a number of cells, one of which is shown as 105 in FIG. 1. Each cell can accommodate a number of users, here referred to generically as Mobile Terminals, MTs, of which three are shown in FIGS. 1 as 110, 115 and 120, labeled as MT1, MT2, and MT3.

Each cell such as the one 105 also has a controlling node 125 through which all traffic to and from the MTs in the cell is routed. In WCDMA and CDMA systems, the controlling node 125 is known as the NodeB.

Transmissions from the MTs to the NodeB of their cell are referred to as uplink transmissions, usually abbreviated as UL transmissions. In a WCDMA system which is enabled for enhanced uplink, EUL, uplink transmissions of payload data are suitably carried out on the E-DPDCH channel, E-DCH Dedicated Physical Data Channel, and the uplink transmissions of control data are suitably carried out on the DPCCH channel (Dedicated Physical Control Channel) and on the E-DPCCH channel (EUL Dedicated Physical Control Channel) as well as on the HS-DPCCH channel (High Speed Dedicated Physical Control Channel).

In the system 100 shown in FIG. 1, the MTs are scheduled for uplink transmissions, i.e. transmissions to the NodeB, by means of so called Time Division scheduling, TD scheduling. This means that in each Transmission Time Interval, TTI, only a certain amount of MTs are allowed to transmit payload data as well as control data, while the other MTs are only allowed to transmit control data to the NodeB. An MT which is allowed to transmit payload and control data will in this text be referred to as an active MT or an MT which is in the active state, while an MT which is only allowed to transmit control data will be referred to here as a passive MT or an MT in the passive state. In addition, in some versions of WCDMA, there is also something known as CPC, Continuous Packet Connectivity, in which an MT can be in so called DTX, in which the MT is (intermittently) not allowed to make any transmissions at all. Thus, CPC DTX is here also included in the definition of a passive MT, together with other states in which an MT is not allowed to make any transmissions at all, or to only transmit control data.

It should be pointed out that an active MT is allowed to transmit control data, but is not obliged to do so.

Thus, an MT in the system 100 can be in either the active or the passive state. The state of an MT is at present maintained over at least one TTI, although a TTI consists of three so called "time slots". Naturally, the invention can also be used in systems in which an MT changes its state within a TTI, i.e. between time slots in a TTI.

The output power used by the MTs in the UL transmissions is controlled by the NodeB of the cell, by means of Transmit Power Control commands from the NodeB to the MTs.

Figure 2:
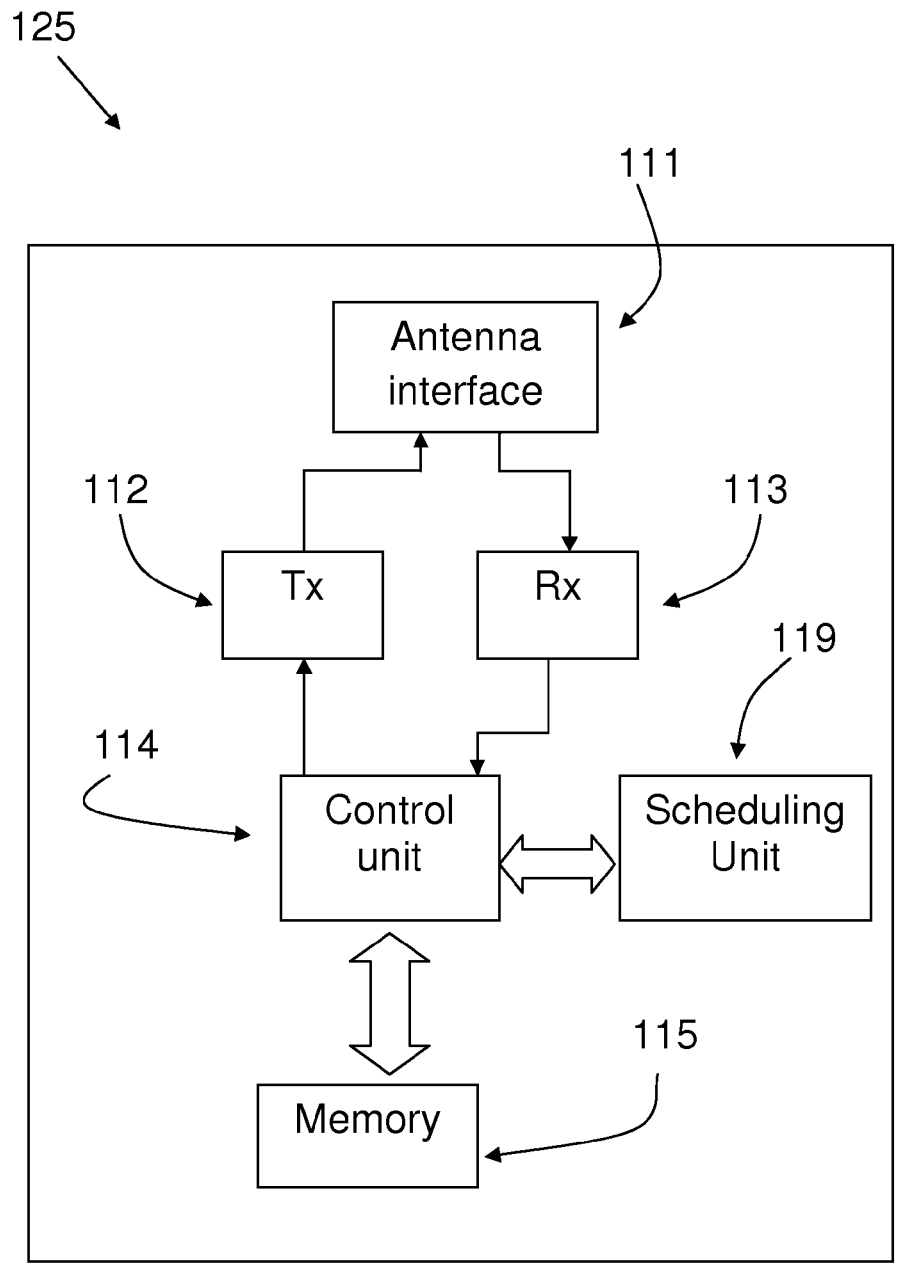
FIG. 2 shows a block diagram of an embodiment of a device of the invention.

FIG. 2 shows a schematic block diagram of a NodeB 125 of the invention. As can be seen, the NodeB 125 comprises an antenna interface 110 for connection to an antenna which can either be internal or external to the NodeB, and which is used for transmissions to and from the MTs in the cell or cells which is/are controlled by the NodeB 125. In addition, the NodeB 125 also comprises a transmit unit Tx 112 and a receive unit Rx 113, which are used in transmissions to and reception from the MTs in said cell or cells.

The operation of the NodeB 125 is mainly controlled by a control unit 114, which has interfaces to both the transmit unit 112 and the receive unit 113. In addition, the NodeB 125 also comprises a memory unit 115 which also has an interface to the control unit 114, which can access data stored in the memory unit 115.

As is also shown in FIG. 2, the NodeB 125 comprises a scheduling unit 119, which also interfaces to the control unit 114. The NodeB 125 schedules the MTs in the cell or cells which is/are controlled by the NodeB to be active or passive, which is done "per TTI", Transmission Time Interval. In other words, at least at present, an MT will remain in the active or passive state for an entire TTI, although a TTI is comprised of a number of so called time slots, for example three time slots per TTI. Naturally, the invention can also be applied in systems in which an MT can change its status per time slot instead of per TTI, as well as in systems in which there are more or fewer than three time slots per TTI.

In more detail, the scheduling unit 119 gives so called "grants" to the MTs per each so called HARQ-process, where each HARQ process is tied to one TTI. The grant concerns the right of the MT to transmit payload data as well as control data, or control data only, i.e. the grant of an MT can be directly "translated" to the status of the MT.

Thus, the NodeB 125 can classify the status, active or passive, of an MT in a cell which is controlled by the NodeB by means of the grants given by the scheduling unit 119 to the MT. The grants can, for example, be kept track of by the control unit 114 and stored in the memory unit 115. The status of an MT is then used by the NodeB when deciding which Transmit Power Control, TPC, method to use for determining TPC commands to the MT. For an MT which is in the active state, the NodeB will use one TPC method, and for an MT which is in the passive state, the NodeB will use another TPC method. The same principle can of course be used in a system in which there are more than two states for an MT, i.e. the TPC method used by the NodeB for an MT is varied according to the state of the MT.

As mentioned above, in one embodiment of the NodeB 125, it is the Control Unit 114 which classifies the MTs according to their state, i.e. active or passive, and which then decides which TPC method to use for an MT depending on the state of the MT, i.e. the state that the MT is classified as being in. It should however be emphasized that the division of tasks in the NodeB 125 described herein is by way of example only, other divisions or entirely other units in the NodeB are also possible in order to realize the invention, for example a separate "classification unit" which keeps track of the grants given by the scheduling unit and uses the grants in order to perform the classification of the MTs state.

Turning now to the issue of the different TPC methods which the NodeB 125 is arranged to use according to the different states of an MT, in the embodiments described herein, these methods rely on measurements of the transmissions from the MT as received by the NodeB. However, other kinds of methods can also be envisioned within the scope of the invention.

In those methods which rely on measurements of the transmissions from the MTs as received by the NodeB, the measurements are suitably, although not necessarily, carried out in the receiver unit Rx 113 together with the Control Unit.

In one embodiment, for an MT which is in the active state, the NodeB is arranged to use a TPC method which is based on the Signal to Interference Ratio, the SIR, of the MT's transmissions to the NodeB. In more detail, the NodeB has an SIR "target value", and if the SIR of the signals from the MT is lower than the target value, the MT is ordered by the NodeB to increase the output power of its transmissions, and conversely, if the SIR exceeds or equals the target value, it is ordered by the NodeB to decrease the output power of its transmissions.

In another embodiment, for an MT which is in the active state, the NodeB is arranged to use a TPC method which is based on the Signal to Interference and Noise Ratio, the SINR, of the MT's transmissions to the NodeB. In more detail, the NodeB has an SINR "target value", and if the SINR of the signals from the MT is lower than the target value, the MT is ordered by the NodeB to increase the output power of its transmissions, and conversely, if the SINR exceeds or equals the target value, it is ordered by the NodeB to decrease the output power of its transmissions.

In yet another embodiment, for an MT which is in the active state, the NodeB is arranged to use a TPC method which is based on the RoT, Rise over Thermal, of the MT's transmissions to the NodeB. In more detail, the NodeB has an RoT "target value", and if the RoT of the signals from the MT is lower than the target value, the MT is ordered by the NodeB to increase the output power of its transmissions, and conversely, if the RoT exceeds or equals the target value, it is ordered by the NodeB to decrease the output power of its transmissions.

As an example of a TPC method used by the NodeB for MTs which are in the passive state, a suitable method is the RSCP method, Received Signal Code Power. In similarity to the methods described above, the NodeB has an RSCP "target value", and if the RSCP of the signals from the MT is lower than the target value, the MT is ordered by the NodeB to increase the output power of its transmissions, and conversely, if the RSCP exceeds or equals the target value, it is ordered by the NodeB to decrease the output power of its transmissions.

As can be seen, two TPC methods are employed, one for MTs in the active state and one for MTs in the passive state. One such combination is SIR for active MTs and RSCP for MTs in the passive state, which can be expressed as the SIR/RSCP combination. As is evident, other combinations would be SINR/RSCP and RoT/RSCP. It should also be pointed out that RSCP can be employed for MTs in the active state, if another TPC method is used for MTs in the passive state.

Which particular combination that is employed depends on the requirements of the particular system or location. It should also be pointed out that other TPC methods than those listed here can also be used within the scope of the invention, using the principles disclosed in this text.

Regarding advantages of the different combinations, an observation that can be made is that the SINR/RSCP (active/passive) combination might be better at avoiding power peaks in the cell, while the RSCP/SINR (active/passive) combination could be more useful for maintaining control channel quality.

Figure 3:
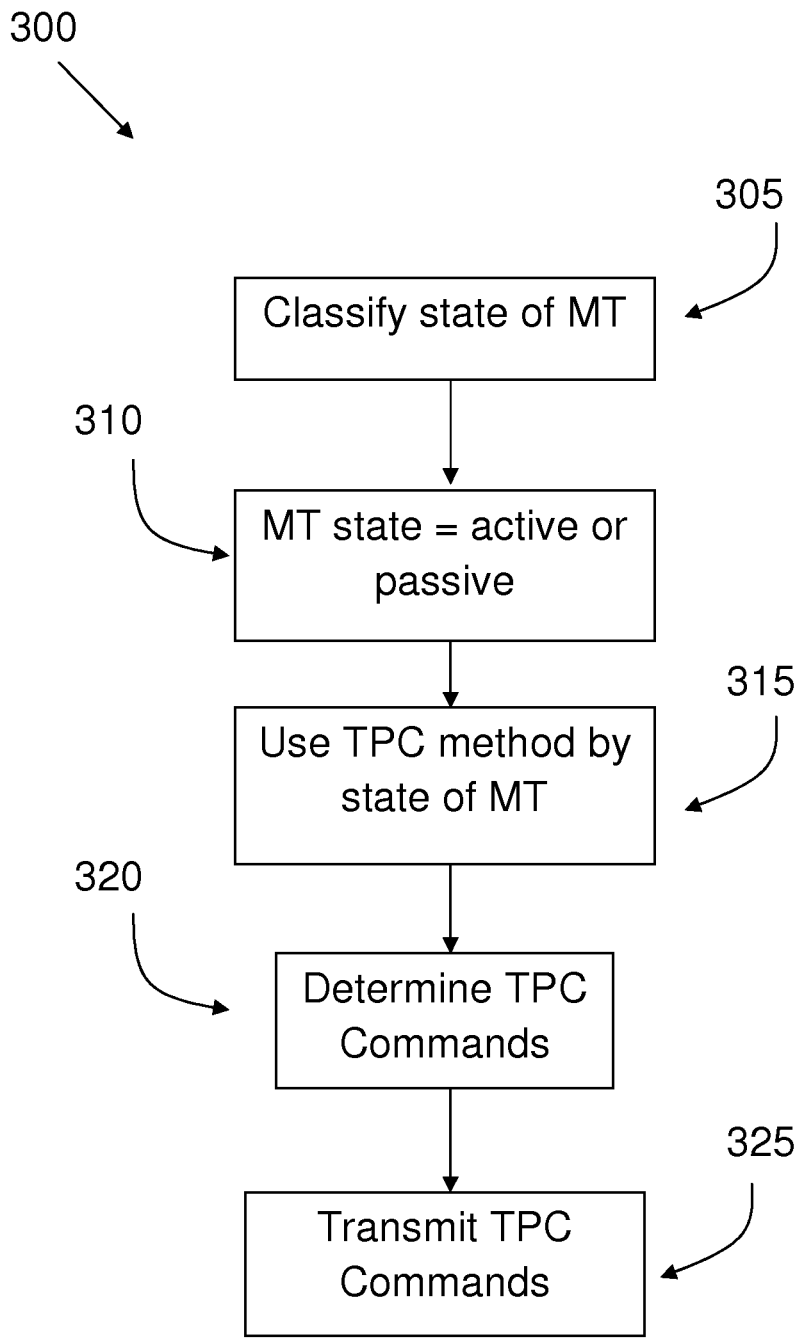
FIG. 3 shows a flow chart of an embodiment of a method of the invention.

FIG. 3 shows a first schematic flow chart of a method 300 of the invention: In step 305, an MT is classified as being in one of a number of states. As shown in step 310, in one embodiment, those states comprise an active and a passive state, where, in the active state an MT is allowed to transmit payload data and control data and, in the passive state, an MT is allowed to transmit control data, said transmissions in both states being to a controlling node such as a NodeB. In addition, as pointed out above, the passive state here also includes a state in which the MT is not allowed to not make any transmissions at all.

As shown in step 315, differing methods are used for determining an MT's TPC commands depending on which state, active or passive, that the MT is in, so that one method is used for determining TPC commands to an MT in the active state and another method is used for determining TPC commands to an MT in the passive state.

Steps 320 and 325 show that the TPC commands are determined and transmitted to the MT.

Figure 4:
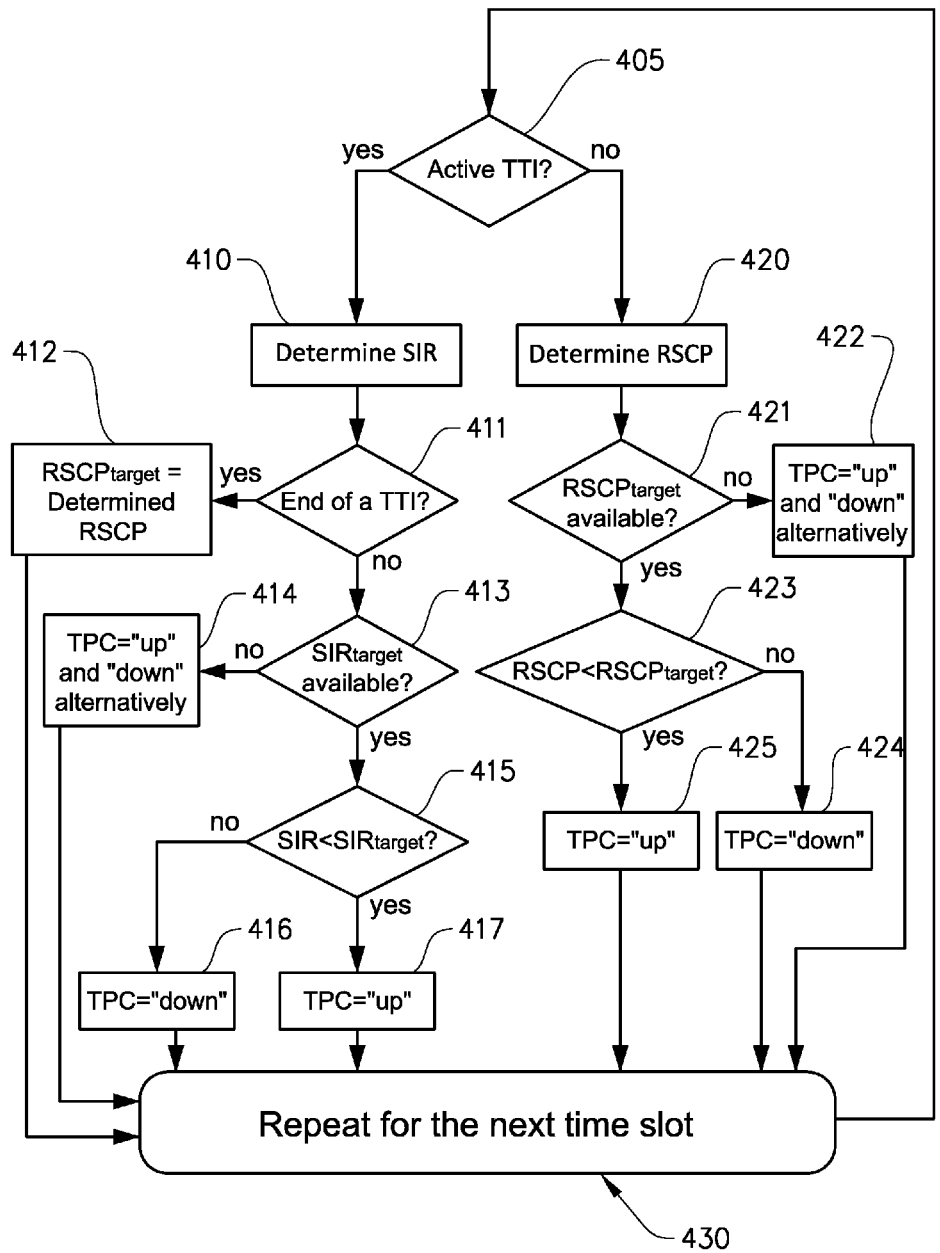
FIG. 4 shows a flow chart of an embodiment of a method of the invention.

FIG. 4 shows a flow chart of an embodiment of a method 400 in which the SINR is used as TPC method for an MT when it is the active state and RSCP is used when the MT is in the passive state. The combination of SINR/RSCP as TPC methods in the active/passive states of the MT aims at maintaining a given target DPCCH transmission power level in passive TTIs, with the target value being obtained by estimating the received DPCCH power in the MTs active TTIs, i.e. to base the target value for passive TTIs on the situation in the active TTIs.

In step 405, the NodeB determines if the MT in question is active or passive in the TTI in question. The "YES branch" will be described first, i.e. the case in which the MT is in the active state: The SIR, Signal to Interference Ratio of the transmissions from the MT is determined in step 410. In step 411, the NodeB examines if the time slot is the final time slot of the TTI (a TTI at present comprises three time slots). If this is so, i.e. "YES", the RSCP target value which will be used in the case of an upcoming passive TTI (i.e. the "NO" branch in step 405) is set by means of determining the RSCP of the transmissions from the MT in the present TTI, and the method starts over for the next time slot, step 430.

If, in step 411, the NodeB sees that this is not the final time slot of a TTI, the NodeB checks, step 413, if an SIR target value is available, i.e. if such a value has already been set. If the answer is "NO", step 414, the NodeB transmits alternating TPC commands to the MT, i.e. "up" for one time slot and "down" in the next time slot, in order to keep the transmission power of the MT centered about its present value. The "up" and "down" commands are in set steps, for example 1 dB up or down. The method then starts over for the next time slot, step 430.

If an SIR target value is available in step 413, i.e. "YES", the SIR value which was determined in step 410 is compared to the SIR target value, step 415. Depending on whether or not the determined SIR value is larger or smaller than the SIR target value, the NodeB transmits TPC "up" or "down" commands to the MT, steps 416 and 417. The "up" and "down" commands are in set steps, for example 1 dB up or down. The method then starts over for the next time slot, step 430.

Turning now to the case of a passive MT, i.e. a TTI in which the MT is passive, the "NO" branch in step 405, in step 420 the RSCP of the transmissions from the MT is determined. In step 421, The NodeB checks if there is an RSCP target value available. In the "NO" case, i.e. step 422, the NodeB transmits alternating TPC commands to the MT, i.e. "up" in one time slot and "down" in the next time slot, in order to keep the transmission power of the MT centered about its present value. The "up" and "down" commands are in set steps, for example 1 dB up or down. The method then starts over for the next time slot, step 430.

In the "YES" case, i.e. there is an RSCP target value available, the determined RSCP value is compared to the RSCP target value, step 423. Depending on whether or not the determined RSCP value is larger or smaller than the RSCP target value, the NodeB transmits TPC "up" or "down" commands to the MT, steps 416 and 417. The "up" and "down" commands are in set steps, for example 1 dB up or down. The method then starts over for the next time slot, step 430.

Figure 5:
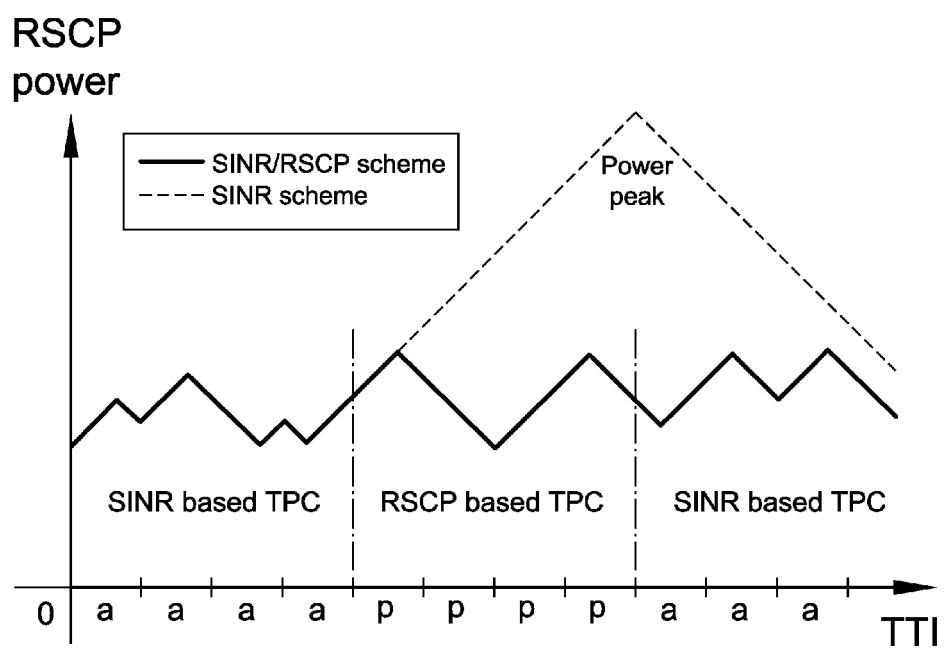
FIGS. 5 and 6 show graphs of results obtained by means of the invention.

FIG. 5 shows the performance of a combined SINR/RSCP scheme in active/passive TTIs for an MT as described herein. The letters "a" and "p" on the horizontal axis denote "active" and "passive", respectively. The dashed line shows the power usage of a conventional SINR scheme, and as can be seen, this conventional scheme causes high transmission peaks in passive TTIs and power waste in active TTIs.

Figure 6:
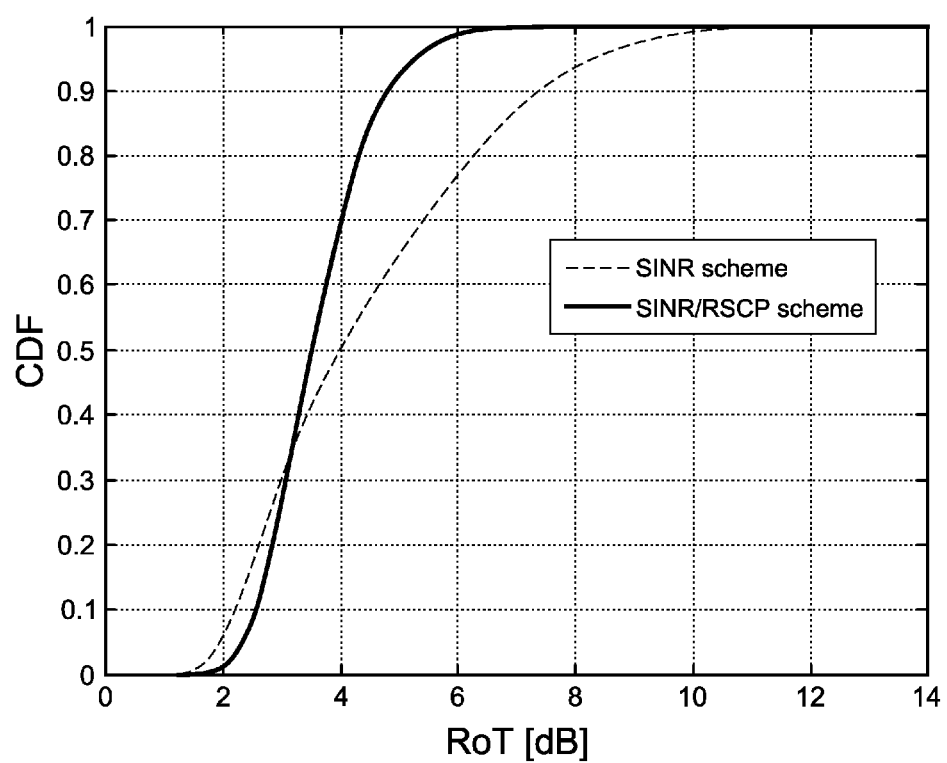

FIG. 6 shows a comparison between a combined SINR/RSCP based TPC method in active/passive TTIs for an MT as described herein, and a traditional SINR method for the same MT. The comparison is shown as the Cumulative Distribution Function of the RoT, and shows an approximate gain of 2.5 dB at the 90-percentile value for the combined SINR/RSCP method as opposed to the traditional SINR method, and also shows that the combined SINR/RSCP method requires less RoT headroom due to its smaller RoT variation.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A controlling node for a cellular communications system, the controlling node being arranged to determine and transmit commands for Transmit Power Control (TPC) associated with uplink transmission to one or more Mobile Terminals (MTs) in at least one cell in the system, the controlling node further being arranged to classify an MT as being in one of a number of states, and to use differing methods for determining an MT's TPC commands depending on which state the MT is in, so that one method is used for determining TPC commands to an MT in the active state and another method is used for determining TPC commands to an MT in the passive state.

2. The controlling node of claim 1, in which the states that an MT can be classified as being in comprise an active state in which the MT is allowed to transmit payload data and control data, and a passive state in which the MT is allowed to transmit control data or to not make any transmissions at all.

3. The controlling node of claim 2, being arranged to use one of the following as a first TPC method for MTs in the active state and a second TPC method for MTs in the passive state:
   a TPC method which is based on the received Signal to Interference Ratio of transmissions from the MT,
   a TPC method which is based on the Signal to Interference and Noise Ratio of transmissions from the MT which is classified as being in the active state for determining TPC commands to the MT,
   a TPC method which is based on the Received Signal Code Power of transmissions from the MT, and
   a TPC method which is based on the Rise over Thermal of transmissions from the MT.

4. The controlling node of claim 1, further being arranged to receive payload data from MTs on a data channel.

5. The controlling node of claim 1, further being arranged to receive control data from MTs on a control channel.

6. The controlling node of claim 1, the controlling node being a NodeB for a CDMA system or a WCDMA system.

7. A method for operating a controlling node in a cellular communications system, the method comprising:
   determining and transmitting commands for Transmit Power Control (TPC) associated with uplink transmission to one or more Mobile Terminals (MTs) in at least one cell in the system,
   wherein an MT is classified as being in one of a number of states, and differing methods are used for determining an MT's TPC command depending on which state the MT is in, so that one method is used for determining TPC commands to an MT in the active state and another method is used for determining TPC commands to an MT in the passive state.

8. The method of claim 7, wherein the states that an MT is classified as being in comprise an active state in which the MT is allowed to transmit payload data and control data and a passive state in which the MT is allowed to transmit control data or to not make any transmissions at all.

9. The method of claim 7, further comprising the use one of the following as TPC method for MTs in the active state and another of the following as TPC method for MTs in the passive state:
   a TPC method which is based on the received Signal to Interference Ratio of transmissions from the MT,
   a TPC method which is based on the Signal to Interference and Noise Ratio of transmissions from the MT which is classified as being in the active state for determining TPC commands to the MT,
   a TPC method which is based on the Received Signal Code Power of transmissions from the MT, and
   a TPC method which is based on the Rise over Thermal of transmissions from the MT.

10. The method of claim 7, further comprising receiving payload data from MTs on a data channel.

11. The method of claim 7 any, further comprising receiving control data from MTs on a control channel.

12. The method of claim 7 any, wherein the controlling node is a NodeB in a CDMA system or a system.

\* \* \* \* \*